(12) United States Patent
Ogiwara

(10) Patent No.: US 6,559,929 B1
(45) Date of Patent: May 6, 2003

(54) IMAGE FORMING METHOD AND IMAGE FORMING APPARATUS

(75) Inventor: Nagao Ogiwara, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 83 days.

(21) Appl. No.: 09/617,918

(22) Filed: Jul. 17, 2000

(30) Foreign Application Priority Data

Jul. 15, 1999 (JP) .......................................... 11-201334
Jun. 9, 2000 (JP) ....................................... 2000-174179

(51) Int. Cl.[7] .......................... G03B 27/00; G03B 27/52
(52) U.S. Cl. .......................................... 355/405; 355/40
(58) Field of Search ........................... 355/40–41, 47, 355/405–407, 77, 27–29; 347/212, 217; 396/575, 580

(56) References Cited

U.S. PATENT DOCUMENTS 5,819,130 A * 10/1998 Inoue .......................... 396/571
5,887,212 A * 3/1999 Ozaki .......................... 396/575
6,337,705 B1 * 1/2002 Tanaka et al. .............. 347/213

* cited by examiner

Primary Examiner—Henry Hung Nguyen
(74) Attorney, Agent, or Firm—Sughrue Mion, PLLC

(57) ABSTRACT

A heat development and transfer process in which a photosensitive material and an image receiving material are laminated and wound around an outer peripheral surface of a drum, the photosensitive material and the image receiving material being pressed and laminated between at least one roller and the drum. The photosensitive material and the image receiving material are heated while being conveyed along the outer peripheral surface of the drum synchronously with a rotation of the drum. The photosensitive material and the image receiving material laminated are kept in a state in which they are pressed onto the outer peripheral surface of the drum by a belt supporting mechanism or a roller support mechanism. Subsequently, the photosensitive material and the image receiving material are passed through the entrance of the heating conveying path again, and then the photosensitive material and the image receiving material are stripped.

2 Claims, 6 Drawing Sheets

F I G. 1
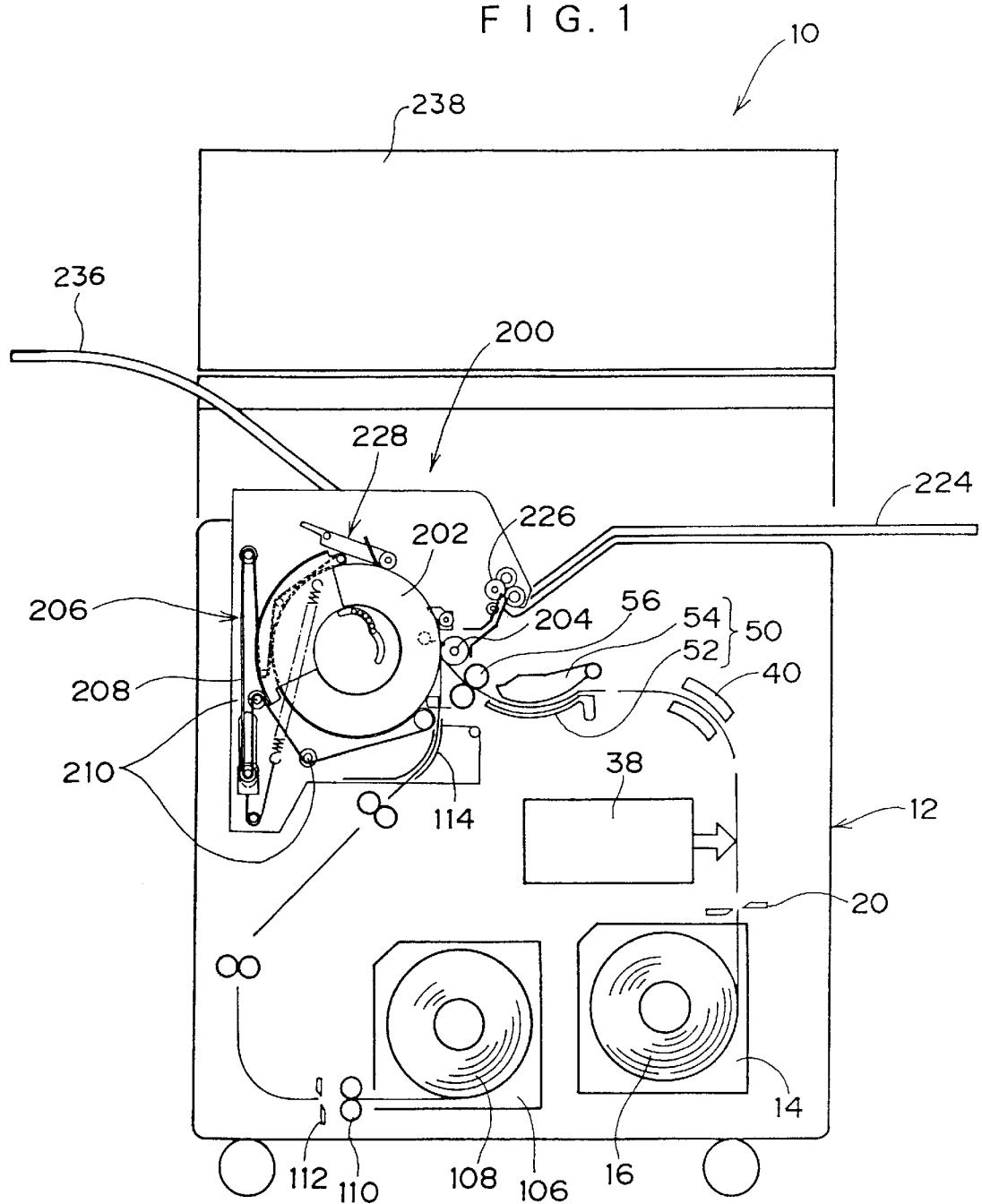

IMAGE FORMING METHOD AND IMAGE FORMING APPARATUS

BACKGROUND OF THE INVENTION

1. Field of the Invention

This invention relates to an image forming method and an image forming apparatus for performing a heat development and transfer process by laminating an exposed photosensitive material and an image receiving material and heating them.

2. Description of the Related Art

In general, a laser-exposure heat development and transfer type image forming apparatus (silver salt photography type) is used. In an image forming apparatus of this type, an output print is obtained through a process such as that shown in FIG. 6. First, in an exposure process, input signals of image data are subjected to image processing at a CPU 500, and the signals subjected to image processing are sent to a semiconductor unit 502.

At this semiconductor unit 502, an exposure surface of a donor piece 506 which has been pulled out to a predetermined length and cut from a donor roll 504 wound in a roll is irradiated with light from a laser (LD) source which emits light having three different wavelengths to simultaneously expose three photosensitive layers thereof. By this exposure, silver halide in the donor piece 506 is sensitized by the light from the light source and a latent image is formed (on the donor piece 506), and then, the donor piece 506 is sent to a solvent coating process next.

In this solvent coating process, the surface of the donor piece 506 is evenly coated with a predetermined small amount of water, and the donor piece 506 is sent to a heat development and color image transfer process next.

In this heat development and color image transfer process, the donor piece 506 coated with water is superposed on, and adhered to a piece of image receiving paper 512 (or OHP film or the like) which has been prepared by being pulled out to a predetermined length and cut from a roll of image receiving paper 510. In this state, the piece of image receiving paper 512 and the donor piece 506 are heated by a heating device 514.

By this, a development progresses at the donor piece 506 side and dyes on the donor piece 506 are transferred to the piece of image receiving paper 512 and fixed. Thus the image on the donor piece 506 is transferred to the piece of image receiving paper 512. After the transfer is completed, the donor piece 506 and the piece of image receiving paper 512 which were laminated are separated.

When the donor piece 506 and the piece of image receiving paper 512 onto which the image is transferred are separated, the used donor piece 506 is discarded, and the process by which the piece of image receiving paper 512 becomes a high quality color print is completed and the print is sent out.

Conventionally, a heating drum 516 schematically shown in FIG. 6 is employed as the heating device 514 used in the image forming apparatus of this type. The heating drum 516 is structured so as to be rotatably driven by an unillustrated motor, and such that an outer peripheral surface thereof is evenly heated by a heater.

The donor piece 506 and the piece of image receiving paper 512 are placed together and sandwiched between the heating drum 516 and a laminating roller 518 which rotatably contacts the outer peripheral surface of the heating drum at an upstream side in a material conveying direction, and then laminated.

The donor piece 506 and the piece of image receiving paper 512 which are rotated in a state in which they are wound around the outer peripheral surface of the heating drum 516, are heated on the heating drum 516 and developed and transferred.

The donor piece 506, which has been sent by a rotation of the heating drum 516 to a separating roller 520 which rotatably contacts the outer peripheral surface of the heating drum 516 at a downstream side in a conveying direction thereof, is stripped by a stripping finger and pulled out by the separating roller 520. Further, the piece of image receiving paper 512, which has been sent to a separating roller 522 which rotatably contacts the outer peripheral surface of the heating drum 516 at the downstream side in the conveying direction, is stripped by another stripping finger and pulled out by the separating roller 522.

In the image forming apparatus such as described above, in order to be able to process even large-size sheets of both of the donor piece 506 and the piece of image receiving paper 512, the heating drum 516 needs to be structured such that the large-size donor piece 506 and the large-size piece of image receiving paper 512 can be wound around the outer peripheral surface thereof.

However, the portion of the outer peripheral surface of the heating drum 516 from the separating roller 520 toward the conveying direction downstream side through to the separating roller 522 and onto the laminating roller 518, is an area for separating and pulling out the donor piece 506 and the piece of image receiving paper 512.

Therefore, since the outer periphery of the heating drum 516 cannot be fully used, a large-size heating drum 516 whose diameter is increased so that the length of the outer peripheral surface on which the belt winding mechanism is mounted (that is, a portion of the surface between the laminating roller 518 and the separating roller 520) is greater than the length of the large-size donor piece 506 and the piece of image receiving paper 512, must be used. Therefore, there has been a problem that the entire image forming apparatus becomes large and expensive.

Utilizing a conventional flat-plate type heating apparatus as a heating apparatus used in an image forming apparatus may be considered. However, the flat-plate type heating apparatus has to use a belt conveying device which is trained around many guide rollers in order to send the donor piece and the piece of image receiving paper. Further, an extremely accurate processing for a flat surface of a flat-type heater is required. Therefore, there has been a problem that the apparatus becomes expensive.

SUMMARY OF THE INVENTION

In view of the above-described facts, an object of the present invention is to newly provide an image forming apparatus which can form an image on a large-size material, and can be made compact and inexpensive.

The first aspect of the present invention is an image forming method for performing a heat development and transfer process in a state in which a photosensitive material and an image receiving material are laminated and wound around an outer peripheral surface of a drum, including the steps of: (a) placing the photosensitive material and the image receiving material together and pressing them to laminate; (b) introducing the photosensitive material and the image receiving material onto the outer peripheral surface of the drum through an entrance of a heating conveying path for carrying in the photosensitive material and the image receiving material which have been laminated; (c) heating the photosensitive material and the image receiving material in a state in which they are laminated while being conveyed along the outer peripheral surface of the drum synchronously with a rotation of the drum; and (d) separating the photosensitive material and the image receiving material which have been subjected to a heat development and transfer process on the drum after passing them through the entrance of the heating conveying path a second time.

By structuring an apparatus to carry out the image forming method as described above, a large size photosensitive material and a large size image receiving material can be thermally developed and transferred using a drum having a relatively small diameter by effectively utilizing an outer peripheral surface of the drum since substantially all the outer peripheral surface of the drum can be set as an area for the heat development and transfer process. Thus, the image forming apparatus can be made compact since the image forming apparatus which carries out the heat development and transfer process for a large size photosensitive material and a large size image receiving material can be formed employing a drum having a relatively small diameter.

The second aspect of the image forming apparatus of the present invention is an image forming apparatus for performing a heat development and transfer process in a state in which a photosensitive material and an image receiving material are laminated and wound around an outer peripheral surface of a drum, including: an exposure device which exposes the photosensitive material; a drum which performs the heat development and transfer process on the photosensitive material and the image receiving material are laminated and wound around the outer peripheral surface thereof; a roller which places the photosensitive material and the image receiving material together, press-attaches them, and carries them in along the outer peripheral surface of the drum; a belt support mechanism which holds the photosensitive material and the image receiving material, which are conveyed along the outer peripheral surface of the drum synchronously with a rotation of the drum, by pressing them against the outer peripheral surface of the drum, and which comes after the roller and is formed so as to be movable from a covering state in which it covers the outer peripheral surface of the drum corresponding to a conveying direction downstream side portion, to an open state; a photosensitive material stripping member which is attached in a vicinity of the roller and strips off the photosensitive material placed together with the image receiving material on the outer peripheral surface of the drum which has been subjected to the heat development and transfer process and has the photosensitive material conveyed out; and an image receiving material stripping member which comes after the photosensitive material stripping member and is provided at downstream side thereof and strips off the image receiving material which is wound on the outer peripheral surface of the drum and has been subjected to the heat development and transfer process and has the image receiving material conveyed out.

With the above described structure, the photosensitive material and the image receiving material laminated are introduced through an entrance of a laminating roller and conveyed along the outer peripheral surface of the drum, and the heat development and transfer process is carried out while the photosensitive material and the image receiving material are held pressed against the outer peripheral surface of the drum by the belt supporting mechanism.

After the heat development and transfer process, a portion of the belt supporting mechanism at a downstream side in a conveying direction following the laminating roller is pulled back and released, the photosensitive material which is placed on the outer peripheral surface of the drum and conveyed through the laminating roller is stripped off and pulled out by a stripping member, and thereafter, the image receiving material is stripped off and pulled out by another stripping member.

Hence, since substantially all the outer peripheral surface of the drum which is driven to rotate in a constant direction can be set as an area for the heat development and transfer process, the outer peripheral surface of the drum can be effectively utilized and a large size photosensitive material and a large size image receiving material can be thermally developed and transferred by a drum having a relatively small diameter. Thus, since the image forming apparatus which carries out the heat development and transfer process on the large size photosensitive material and the large size image receiving material can be simply formed employing a drum having a relatively small diameter, the image forming apparatus can be made compact and can be provided inexpensively.

The third aspect of the present invention is an image forming apparatus for performing a heat development and transfer process in a state in which a photosensitive material and an image receiving material are laminated and wound around an outer peripheral surface of a drum, including: an exposure device which exposes the photosensitive material; a solvent coating section in which the photosensitive material is coated with an image forming solvent; a drum-shaped rotating developing device which performs the heat development process on the photosensitive material and the image receiving material laminated on the outer peripheral surface thereof which is heated to a predetermined temperature; at least one roller which is provided at a predetermined position on the outer peripheral surface of the drum-shaped rotating developing device and which press-attaches the photosensitive material and the image receiving material laminated and conveys them onto the outer peripheral surface; a material holding mechanism which holds the photosensitive material and the image receiving material conveyed onto the outer peripheral surface of the developing device so as to press them onto the outer peripheral surface; and a material paper stripping device which is attached adjacent to the roller and which strips off and carries out the photosensitive material and the image receiving material after they are subjected to the heat development and transfer process.

BRIEF DESCRIPTION OF THE DRAWINGS

FIG. 1 is a schematic overall structural view of an image forming apparatus relating to an embodiment of the present invention.

DESCRIPTION OF THE PREFERRED EMBODIMENTS

Figure 2:
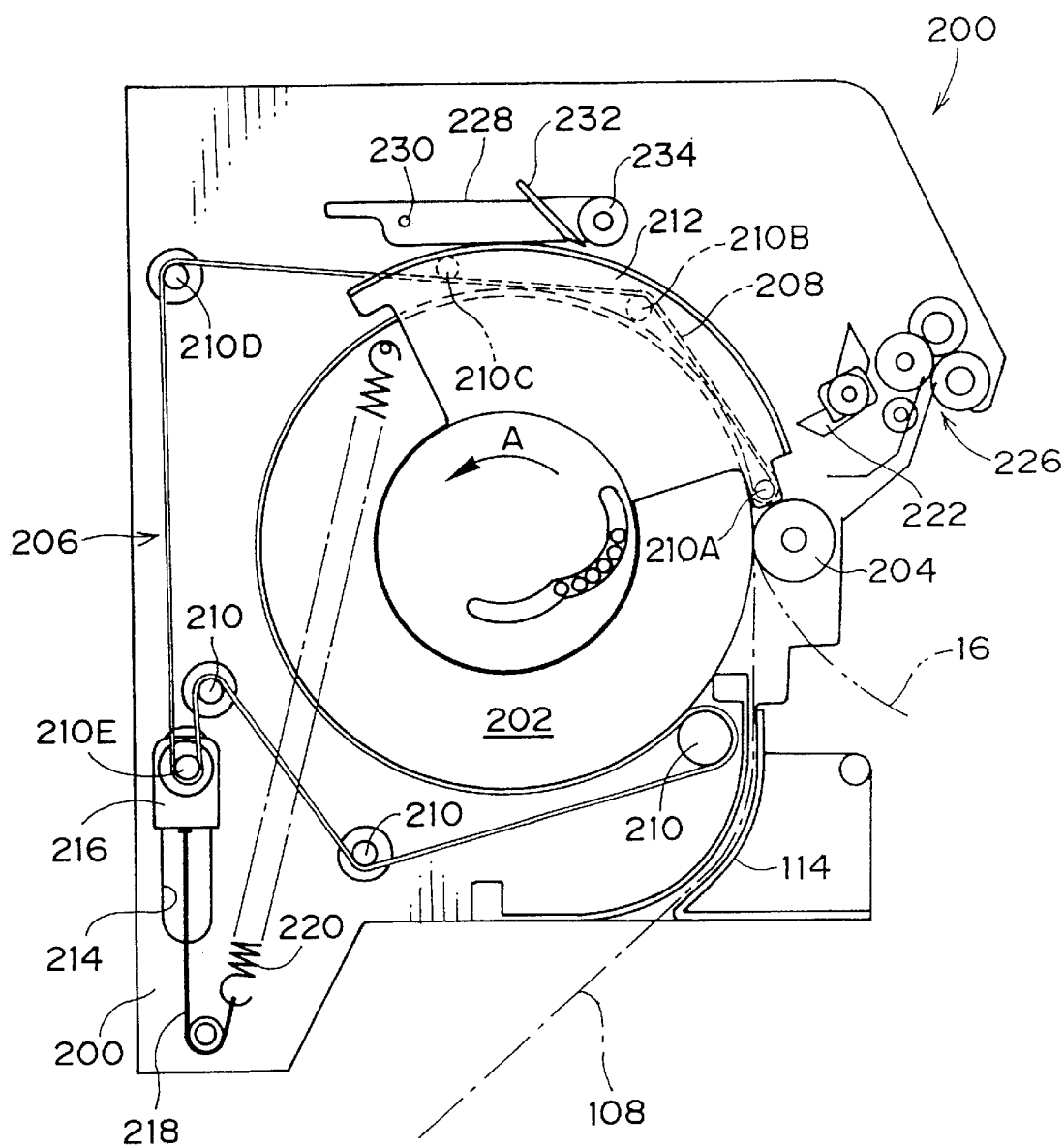
FIG. 2 is a structural view of a main portion of the image forming apparatus relating to the embodiment of the present invention showing a heat development and transfer section in a state in which a heat development and transfer processing can be carried out.

A first embodiment relating to an image forming apparatus of the present invention is explained below with reference to FIGS. 1 through 3.

FIG. 1 shows a schematic overall structure of an image forming apparatus relating to the first embodiment of the present invention.

In the inner portion of a machine base 12 of the image forming apparatus 10 illustrated in FIG. 1, a photosensitive material magazine 14, shown at the lower right-hand portion of FIG. 1, which accommodates a photosensitive material 16 is disposed.

The photosensitive material 16 pulled out from the photosensitive material magazine 14 is conveyed upward in FIG. 1.

Unillustrated nip rollers and a cutter 20 are disposed near a photosensitive material outlet port of the photosensitive material magazine 14. The photosensitive material 16 can be cut by the cutter 20 after it is pulled out to a predetermined length from the photosensitive material magazine 14. The cutter 20 is a rotary type cutter which includes, for example, a fixed blade and a movable blade, and can cut the photosensitive material 16 by the movable blade being moved by a rotating cam or the like and coming in contact with the fixed blade.

The solvent coating section 50 includes a saucer 52 having a curved bottom surface for containing the image forming solvent and a guide member 54 having a circular-arc-shaped guide surface formed thereto. By making the guide surface of the guide member 54 face the bottom surface of the saucer 52, a circular-arc-shaped path for the photosensitive material 16 in which the space between the curved bottom surface and the guide surface is filled with liquid is formed. In the present embodiment, water is used as the image forming solvent.

In the above-described conveying route, the photosensitive material 16 is conveyed on a conveying path upward from the photosensitive material magazine 14, and is exposed by the exposure device 38. Further, the photosensitive material 16 is sent into the solvent coating section 50 through the turn portion 40 by continued conveyance along the conveying path. Water as the image forming solvent is deposited on the photosensitive material 16 at the solvent coating section 50, and after excessive water is squeezed out at squeezing rollers 56, the photosensitive material 16 is sent to a heat development and transfer section 200.

As shown in FIG. 1, an image receiving material magazine 106 which accommodates an image receiving material 108 wound in a roll is disposed in the machine base 12 at a lower left side thereof. A pigment fixing material containing a mordant is applied to an image forming surface of the image receiving material 108.

Nip rollers 110 are disposed near an image receiving material outlet port of the image receiving material magazine 106. The nip rollers 110 nip the image receiving material 108 to pull it out from the image receiving material magazine 106, and an operation to release the nip is carried out.

A cutter 112 is disposed at a side of the nip rollers 110. As in the above described cutter 20 for the photosensitive material, the cutter 112 is a rotary type cutter which includes, for example, a fixed blade and a movable blade, and can cut the image receiving material 108 pulled out from the image receiving material magazine 106 at a length shorter than that of the photosensitive material 16.

The image receiving material 108 thus cut at a predetermined length is conveyed on a conveying path and guided by a guide member 114 and is sent into the heat development and transfer section 200.

Figure 3:
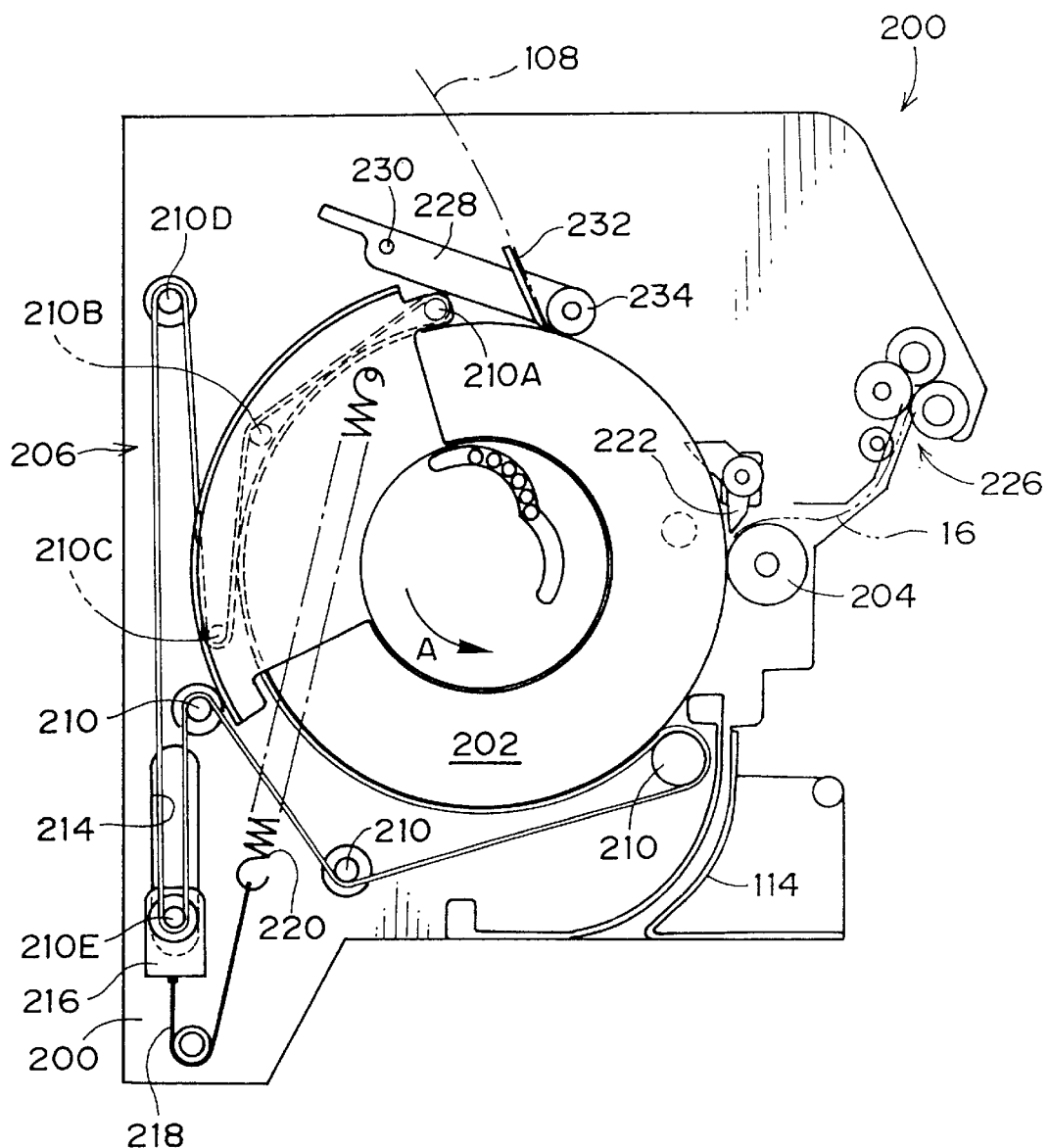
FIG. 3 is the structural view of the main portion of the image forming apparatus relating to the embodiment of the present invention showing the heat development and transfer section in a state in which a paper discharging operation can be carried out.

As shown in FIG. 1 through FIG. 3, the heat development and transfer section 200 is structured as a so-called developing drum. A drum 202 for heating is provided in the heat development and transfer section 200 such that the drum 202 can be controlled so as to be driven and rotated by an unillustrated motor. An unillustrated heater such as a lamp for heating or the like is disposed in the drum 202. The drum 202 is structured such that an outer peripheral surface portion thereof can be heated by the heater to a predetermined temperature.

A laminating roller 204 is disposed so as to rotatably contact the drum 202 at a predetermined position on the outer peripheral surface portion thereof, the predetermined position being an entrance of a heating conveying path. As shown in FIG. 1, the laminating roller 204 is disposed at right-hand side of the drum 202. Axes of rotation of the laminating roller 204 and the drum 202 are positioned at the same height. The laminating roller 204 is attached such that it can be switched between a state in which it is press-contacted to the drum 202 with a relatively high pressing force (a state for laminating) and a state in which it is press-contacted to the drum 202 with a relatively low pressing force (a state for separating) by an unillustrated operating device.

The laminating roller 204 is disposed adjacent to the area above the exit of the squeezing roller 56 and the exit of the guide member 114 described above (FIG. 1). The laminating roller 204 sandwiches aligned front end portions of the photosensitive material 16 sent out from the squeezing roller 56 side and the image receiving material 108 sent out from the guide member 114 side between the drum 202 and the laminating roller 204 and press-attaches them, and then sends them out onto the outer peripheral surface of the drum 202 in a state in which they are laminated.

As shown in FIG. 2, a belt support mechanism 206, which is a means for holding materials to be processed, is provided at the outer peripheral portion of the drum 202 corresponding to a wide range heating area of the drum 202 substantially over the entire periphery starting from the vicinity of the upper side of the laminating roller 204, is wound around the drum 202, and is brought to the vicinity of the exit of the guide member 114 in the figure.

The belt support mechanism 206 conveys the photosensitive material 16 and the image receiving material 108 sent out in a state in which they are laminated on the outer peripheral surface of the drum 202, holding them so as not to come off from the outer peripheral surface of the drum 202. To accomplish this, the belt support mechanism 206 is structured so as to support an endless belt 208 using a plurality of rollers 210, and to move the endless belt 208 synchronously with a rotation of the drum 202 while pressing a portion of the endless belt 208 into contact with the outer peripheral surface of the drum 202.

The belt support mechanism 206 is further structured such that a part of the endless belt 208 trained around the drum 202 can be withdrawn so that a predetermined area of the drum 202 at downstream side of the laminating roller 204 in the conveying direction can be exposed and opened.

To accomplish this, the belt support mechanism 206 is structured with three rollers 210A, 210B and 210C attached to moving operation members 212. The moving operation members 212 formed substantially in a sector form are respectively disposed at end portions of the drum 202, have the same axis of rotation as the drum 202, and are attached so as to be rotatable at a predetermined angle around the axis of rotation of the drum 202.

A circular-arc-shaped periphery of a free end of each of the moving operation members 212 is extended further than the outer periphery of the drum 202, and the end portions of rollers 210A, 210B and 210C are rotatably attached with shafts respectively to three predetermined positions on the extended periphery. That is, both ends of the shaft of each of the three rollers 210A, 210B and 210C are rotatably supported by the two moving operation members 212 so as to span therebetween.

The endless belt 208 is trained around the first roller 210A, which is nearest to the laminating roller 204, such that the endless belt 208 doubles back at the first roller 210A.

One of the doubled portions (the portion to the right of 210B in FIG. 2) of the endless belt 208 which doubles back at the first roller 210A is positioned between the (next) second roller 210B and the drum 202, and the other portion (the portion to the left of 210B in FIG. 2) is positioned at an outer side of the second roller 210B which is opposite to the drum 202 side.

Further, both of two doubled back portions of the endless belt 208 respectively pulled out from the second roller 210B are positioned together between the third roller 210C and the drum 202.

When the moving operation members 212 in a state shown in FIG. 2 are rotated at a predetermined angle in a direction of arrow A and put into a state shown in FIG. 3, the third roller 210C restrains a change in the total length of the path of the endless belt 208 so that the path is not shortened, by winding in a portion of the endless belt 208, which is stretched between the second roller 210B and the fourth roller 210D. The fourth roller 210D is rotatably attached with a shaft to a frame of the heat development and transfer section 200, so that a portion of the endless belt 208 doubles back in a U shape.

Further, among the plurality of rollers 210 supporting the endless belt 208, a roller 210E is structured as a tension-maintaining roller. The roller 210E for maintaining tension is rotatably attached with a shaft to a slider 216 which is slidably attached to a guide hole 214 opened in the frame of the heat development and transfer section 200. A helical tension spring 220 is stretched over the slider 216 via a wire 218. The helical tension spring 220 applies a tension to the entire endless belt 208 mounted around the roller 210E for maintaining tension.

Due to this structure, in the endless belt 208 which is mounted around the plurality of rollers 210 and travels as predetermined, when the moving operation member 212 moves, a change in the total length of the path of the endless belt 208 is absorbed by a movement of the roller 210E for maintaining tension, and a necessary tension is applied to the entire endless belt 208 by the helical tension spring 220. Hence, the endless belt 208 mounted around the plurality of rollers 210 is held so as to travel stably.

A stripping finger 222 for the photosensitive material 16 is attached to the heat development and transfer section 200, near to the laminating roller 204. The stripping finger 222 is formed as a finger which strips and pulls out only the photosensitive material 16 when the photosensitive material 16 and the image receiving material 108 are sent in a state in which they are laminated on the outer peripheral surface of the drum 202. Further, the stripping finger 222 is attached to the frame of the heat development and transfer section 200 such that it can move between a position in which it is not being used (position of non-use) shown in FIG. 2 and a position in which it is being used (position of use) shown in FIG. 3.

A paper discharging roller portion 226 which catches and sends out the photosensitive material 16 pulled out by the stripping finger 222 to a discharging tray 224 (shown in FIG. 1) is attached to the frame of the heat development and transfer section 200, adjacent to the laminating roller 204.

Further, a stripping finger mechanism 228 for the image receiving material 108 is attached to the frame of the heat development and transfer section 200 at a predetermined position at the downstream side of the stripping finger 222 in the conveying direction of the drum 202.

One end portion of a rectangular small piece member of the stripping finger mechanism 228 is rotatably attached with a shaft pin 230 to the frame of the heat development and transfer section 200, and a stripping finger 232 and a paper discharging roller 234 for the image receiving material 108 are attached to the other end portion thereof.

The stripping finger mechanism 228 is structured so as to be moved between the position of non-use shown in FIG. 2 and the position of use shown in FIG. 3 in accordance with a rotating motion of the moving operation member 212.

The stripping finger mechanism 228 is structured such that, in the operating state shown in FIG. 3, the stripping finger 232 strips off the image receiving material 108 which is wound around the drum 202 from its front end portion as the drum 202 rotates. The paper discharging roller 234 and an unillustrated paper discharging device send the stripped image receiving material 108 out to a stocker 236 for the image receiving material (shown in FIG. 1).

When performing a heat development and transfer process at the heat development and transfer section 200 structured as described above, the photosensitive material 16 sent out from the squeezing rollers 56 and the image receiving material sent out from the guide member 114 are placed together and sandwiched between the drum 202 and the laminating roller 204 in the state shown in FIG. 2 in which the drum 202 is rotated in the direction of arrow A. The photosensitive material 16 is sent between the drum 202 and the laminating roller 204 in a state in which the photosensitive material 16 precedes the image receiving material 108 by a predetermined length.

Then, the photosensitive material 16 and the image receiving material 108, carried onto the outer peripheral surface of the drum 202 in a state in which the photosensitive material 16 is superposed on the image receiving material 108, are laminated by being pressed by the laminating roller 204 so as to be sandwiched with a relatively high pressing force for laminating.

The photosensitive material 16 and the image receiving material 108, thus laminated at the laminating roller 204 portion, move in the direction of arrow A as the drum 202 rotates, and is sandwiched between the endless belt 208 of the belt support mechanism 206 and the drum 202. Since the image receiving material 108 has width and length smaller than those of the photosensitive material 16, the photosensitive material 16 is superposed on the image receiving material 108 with perimeter of the photosensitive material 16 extending from that of the image receiving material 108 in all directions. Further, since the endless belt 208 and the drum 202 operate without coming off from each other due to a frictional resistance between them, the photosensitive material 16 and the image receiving material 108 sandwiched between the endless belt 208 and the drum 202 do not shift from each other and are conveyed in the direction of arrow A synchronously with a rotating motion of the drum 202.

The photosensitive material 16 and the image receiving material 108 placed together are wound around the drum 202 from their front ends to their back ends, and pressed and held by the belt support mechanism 206. When they are put in this state, the rotation of the drum 202 is stopped, and the outer peripheral surface portion of the drum 202 is heated by a heater in the drum 202 to a predetermined temperature. This state in which the rotation of the drum 202 is stopped and the drum 202 is heated is maintained for a predetermined processing time until the heat development and transfer process is completed. Additionally, the heat development and transfer process may be carried out while the drum 202 continues to rotate and the photosensitive material 16 and the image receiving material 18 are heated while being rotated over and over again with the drum 202.

During this heat development and transfer process, the photosensitive material 16 releases movable dyes by being heated by the drum 202, and these dyes are simultaneously transferred to a dye fixing layer of the image receiving material 108 to thereby form an image on the image receiving material 108.

After the photosensitive material 16 and the image receiving material 108 are entirely wound around the drum 202, the state of the laminating roller 204 is switched by the unillustrated operating device so that the laminating roller 204 press-contacts the drum 202 with a relatively low pressing force for separation.

Then, the roller 210C disposed at the moving operation members 212 adjusts the total length of the path of the endless belt 208 so that, as far as possible, it is not changed. The endless belt 208 is adjusted by doubling back a portion thereof so as to pull the endless belt 208 near to the outer peripheral surface of the drum 202.

Further, a difference between an amount of a portion of the path of the endless belt 208 reduced by a movement of the roller 210 A in the direction of arrow A and an amount of a portion of the path increased due to the roller 210C folding back a portion of the endless belt 208 is automatically adjusted by a positional change of the roller 210E by the slider 216 which is urged by the helical tension spring 220. Due to this operation, the endless belt 208 does not become slack at any portion throughout its whole length, and can maintain a proper tension. The roller 210E is disposed such that a portion of the endless belt can be trained around the roller 210E.

Further, when the moving operation member 212 rotates, the stripping finger mechanism 228 is put into a state in which the stripping finger 232 and the paper discharging roller 234 disposed at its free end are put down onto the outer peripheral surface of the drum 202 (see FIG. 3).

Simultaneously, the stripping finger 222 which has been in the position in FIG. 2 advances to a predetermined position of use close to the drum 202 (see FIG. 3).

Thus, the rotation of the moving operation member 212 is stopped when the moving operation member 212 is put in the state of FIG. 3, but the drum 202 still continues to rotate.

Then, both of the photosensitive material 16 and the image receiving material 108 laminated continue to be rotated synchronously with the drum 202, and sandwiched again by the laminating roller 204 between the laminating roller 204 and the drum 202.

Further, the image receiving material 108 which is still adhered to the drum 202 is sent further in the direction of arrow A from the position of the stripping finger 222 and is stripped off from the drum 202 by the stripping finger 232. The image receiving material 108 stripped off by the paper discharging device and the like is sent out to the stocker 236 (shown in FIG. 1).

Then, when the heat development and transfer process and discharging of a set of the photosensitive material 16 and the image receiving material 108 are completed as described above, the moving operation members 212 are rotated in a direction opposite to the direction of arrow A and are returned to the state of FIG. 2. Using this motion, the stripping finger mechanism 228 is returned to the position of non-use in FIG. 2, and further, the stripping finger 222 is returned to the position of non-use.

When the state of FIG. 2 is returned to as described above, the heat development and transfer process begins again for a new photosensitive material 16 and a new image receiving material 108.

Further, in this image forming apparatus, a scanner 238 is disposed on the machine base 12.

Next, operation of the image forming apparatus relating to the present embodiment is explained.

In the image forming apparatus 10 structured as described above, after the photosensitive material magazine 14 is set, the nip rollers are actuated and the photosensitive material 16 is pulled out to the nip rollers. As the photosensitive material 16 is pulled out to a predetermined length, the cutter 20 is actuated to cut the photosensitive material 16 at a predetermined length, and the photosensitive material 16 is conveyed to the front of the exposure device 38 with a photosensitive (exposure) surface of the photosensitive material 16 facing the exposure device 38. When this photosensitive material 16 passes through the exposure device 38, an image is exposed by being scanned onto the photosensitive material 16 by the exposure device 38 on the basis of signals processed by the scanner 238 and the like.

When the exposure is completed, the exposed photosensitive material 16 is sent to the solvent coating section 50. At the solvent coating section 50, water as an image forming solvent is deposited onto the conveyed photosensitive material 16.

Then, the photosensitive material 16 coated with water is sent from the squeezing rollers 56 into the laminating roller 204 portion of the heat development and transfer section 200.

As the photosensitive material 16 is exposed by scanning, the image receiving material 108 is also pulled out by the nip rollers 110 from the image receiving material magazine 106 and conveyed. When the image receiving material 108 is pulled out to a predetermined length, the cutter 112 is actuated to cut the image receiving material 108 at a predetermined length.

The image receiving material 108 cut by the cutter 112 is conveyed while being guided by the guide member 114. Then, the front end portion of the image receiving material 108 is sent into the laminating roller 204. Then, as described above, as the photosensitive material 16 is sent into the heat development and transfer section 200, the image receiving material 108 is sent into the heat development and transfer section 200, and the image receiving material 108 is sent together with the photosensitive material 16.

As a result, the photosensitive material 16 and the image receiving material 108 are laminated at the laminating roller 204 portion. The photosensitive material 16 and the image receiving material 108 are heated by the drum 202 while being conveyed by the drum 202 sandwiched between the drum 202 and the belt support mechanism 206 due to the drum 202 and the belt support mechanism 206 working together. Development and transfer is then performed to form an image on the image receiving material 108.

Further, when these are discharged from the heat development and transfer section 200, the stripping finger 222 scoops the front end portion of the photosensitive material 16 which is conveyed preceding the image receiving material 108 by a predetermined length, and strips the front end portion of the photosensitive material 16 from the image receiving material 108. The photosensitive material 16 is further conveyed by the paper discharging rollers portion 226, and stacked in the discharge tray 224. At this time, since the photosensitive material 16 dries quickly, there is no need to provide a heater or the like to dry the photosensitive material 16.

On the other hand, the image receiving material 108 separated from the photosensitive material 16 is conveyed by the drum 202, stripped by the stripping finger 232, and sent out, as described above, to the stocker 236 (shown in FIG. 1) by the discharging device and the like to be stocked in the stocker 236.

When the image recording (heat development and transfer) process is performed several times, the above described steps are sequentially performed repeatedly.

In the image forming apparatus relating to the present embodiment described above, with respect to the drum 202, the stripping finger 222 is disposed adjacent to the laminating roller 204 which is an entrance for the photosensitive material 16 and the image receiving material 108 to be wound together onto the drum 202, and the stripping finger 232 is disposed at downstream side in the conveying direction from the laminating roller 204. With this arrangement of the stripping fingers, substantially all the length of the outer periphery of the drum 202 at the downstream side in the material conveying direction from the laminating roller 204 can be used as an area on which the photosensitive material 16 and the image receiving material 108 are wound together for performing the heat development and transfer process.

That is, an area on the outer peripheral surface of the drum 202 on which the heat development and transfer process is performed can be widened. In other words, a central angle of a circular arc on which the heat development and transfer process is performed can be increased. Thus, since the outer peripheral surface of the drum 202 can be effectively utilized so that the heat development and transfer process is performed over the substantially entire outer peripheral surface of the drum 202, the large size photosensitive material 16 and the large size image receiving material 108 can be thermally developed and transferred using the drum 202 having a relatively small diameter.

Therefore, when producing an image forming apparatus which can thermally develop and transfer the large size photosensitive material 16 and the large size image receiving material 108, since the entire apparatus can be structured to have small size by reducing the diameter of the drum 202, the image forming apparatus can be produced inexpensively.

Further, the apparatus of the present embodiment is structured such that the heat development and transfer section 200 is disposed at an upper side in the body of the image forming apparatus, the processed photosensitive material 16 is discharged to the discharge tray 224 at the upper side of the drum 202, and the processed image receiving material 108 is discharged to the stocker 236 at the upper side of the drum 202. Therefore, a conveying path for discharging the processed photosensitive material 16 and a conveying path for discharging the processed image receiving material 108 can be set relatively short, and this can assist in making the entire apparatus compact.

Figure 4:
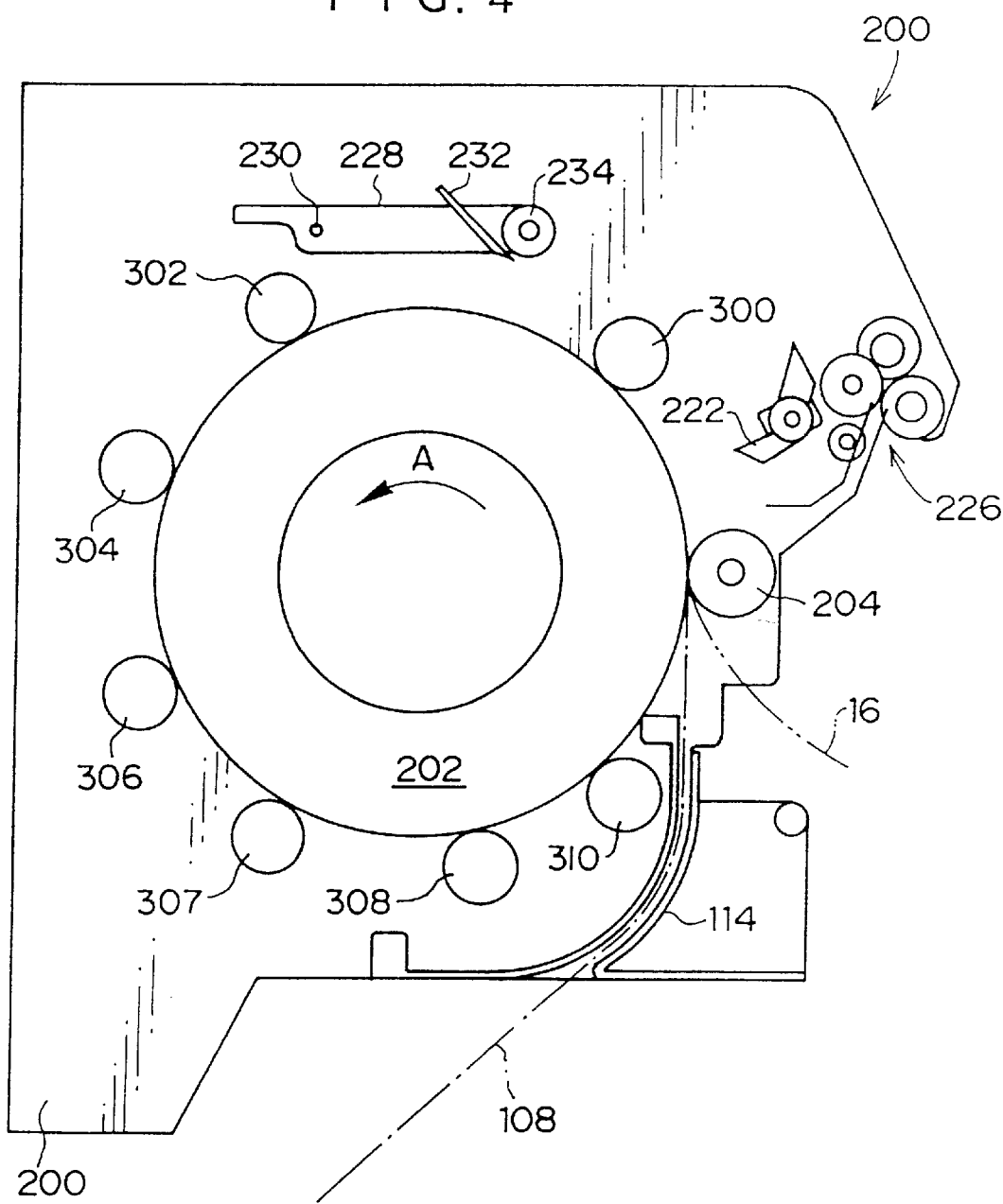
FIG. 4 is a structural view of a main portion of an image forming apparatus relating to a second embodiment of the present invention showing a heat development and transfer section of a roller support structure in a state in which a heat development and transfer process can be carried out.

Next, a second embodiment of the present invention is explained with reference to FIGS. 4 and 5. In the second embodiment of the present invention, a roller support structure is used instead of the belt support mechanism 206 as a mechanism for holding materials to be subjected to a heat development and transfer process.

This roller support structure as a holding device for materials to be processed is structured with rollers disposed so as to be rotatable and to contact a plurality of portions of an outer peripheral surface of a drum 202. First, among those rollers, a first roller 300 is positioned at a predetermined distance from a laminating roller 204. A stripping finger 222 can carry out a predetermined operation within that predetermined interval.

Next, a second roller 302 is positioned at a predetermined distance from the first roller 300. A stripping finger mechanism 228 can carry out a predetermined operation within that predetermined interval.

Similarly, the second roller 302, a third roller 304, a fourth roller 306, a fifth roller 307, a sixth roller 308 and a seventh roller 310 are positioned with a predetermined interval between each other. The predetermined interval is such that a photosensitive material 16 and an image receiving material 18 which are laminated can be conveyed while being held on the outer peripheral surface of the drum 202.

In this manner, the laminated photosensitive material 16 and image receiving material 18 positioned on the outer peripheral surface of the drum 202 are press-contacted onto the outer peripheral surface of the drum 202, and kept in a state in which they are laminated.

The first roller 300, the second roller 302, the third roller 304, the fourth roller 306, the fifth roller 307, the sixth roller 308 and the seventh roller 310 rotate synchronously with a rotation of the drum 202. These rollers keep the photosensitive material 16 and the image receiving material 18 in a state in which they are laminated, and operate so as to convey the photosensitive material 16 and the image receiving material 18 in such a manner that they are passed from roller to roller.

Next, operation and motion in a case in which a heat development and transfer process is carried out at a heat development and transfer section 200 having the roller support structure as described above are explained. In a state shown in FIG. 4, the photosensitive material 16 is sent out from a squeezing roller 56 and the image receiving material 18 is sent out from a guide member 114. The photosensitive material 16 and the image receiving material 18 thus sent out are placed together and sandwiched between the drum 202 and the laminating roller 204. The sandwiched photosensitive material 16 and image receiving material 18 are pressed against the drum 202 with a relatively strong force by the laminating roller 204 and laminated. Thus, the photosensitive material 16 and the image receiving material 18 are laminated between the laminating roller 204 and the drum 202.

The laminated photosensitive material 16 and image receiving material 18 move in a direction of arrow A in accordance with the rotation of the drum 202, and are held on the outer peripheral surface of the drum 202 by being sandwiched between the first roller 300 and the drum 202. The photosensitive material 16 and the image receiving material 18 are further conveyed in the direction of arrow A synchronously with the rotation of the drum 202 and passed to the second roller 302.

In this manner, front end portions of the laminated photosensitive material 16 and image receiving material 18 pass through the first roller 300, the second roller 302, the third roller 304, the fourth roller 306, the fifth roller 307, the sixth roller 308 and the seventh roller 310 in this order, and the photosensitive material 16 and the image receiving material 18 are conveyed by these rollers so as to be wound around the outer peripheral surface of the drum 202. Finally, the laminated photosensitive material 16 and image receiving material 18 are wound around the outer peripheral surface of the drum 202 while being held by all of these rollers.

In this state, the outer peripheral surface of the drum 202 is heated to a predetermined temperature by an internal heater in the drum 202. Then a heat development and transfer process is carried out.

During this heat development and transfer process, the rotation of the drum 202 may be stopped. Alternatively, the rotation of the drum 202 may be continued and, a state in which the photosensitive material 16 and the image receiving material 18 wound around the outer peripheral surface of the drum 202 is conveyed while being held by the roller support structure may be maintained.

If the rotation of the drum 202 is stopped, the rotation of the drum 202 is restarted after a predetermined processing time. Then, the stripping finger 222 moves from a position shown in FIG. 4 to a position shown in FIG. 5 (i.e., a predetermined operating position close to the drum 202). At the same time, the stripping finger mechanism 228 is driven and a stripping finger 232 and a paper discharging roller 234 are put into such a state that they contact the outer peripheral surface of the drum 202.

Figure 5:
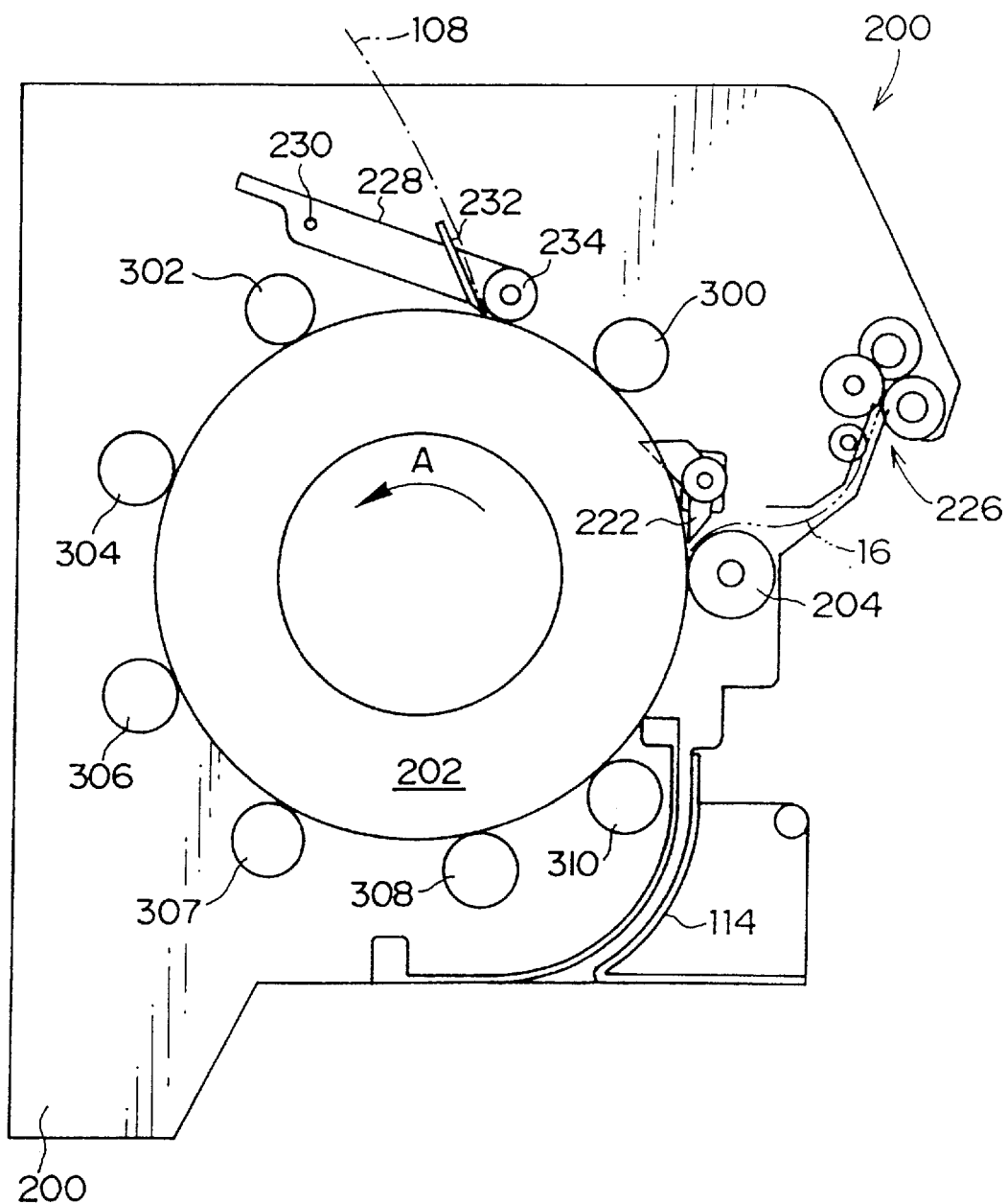
FIG. 5 is the structural view of the main portion of the image forming apparatus relating to the second embodiment of the present invention showing the heat development and transfer section of the roller support structure in a state in which a paper discharging operation can be carried out.
Figure 6:
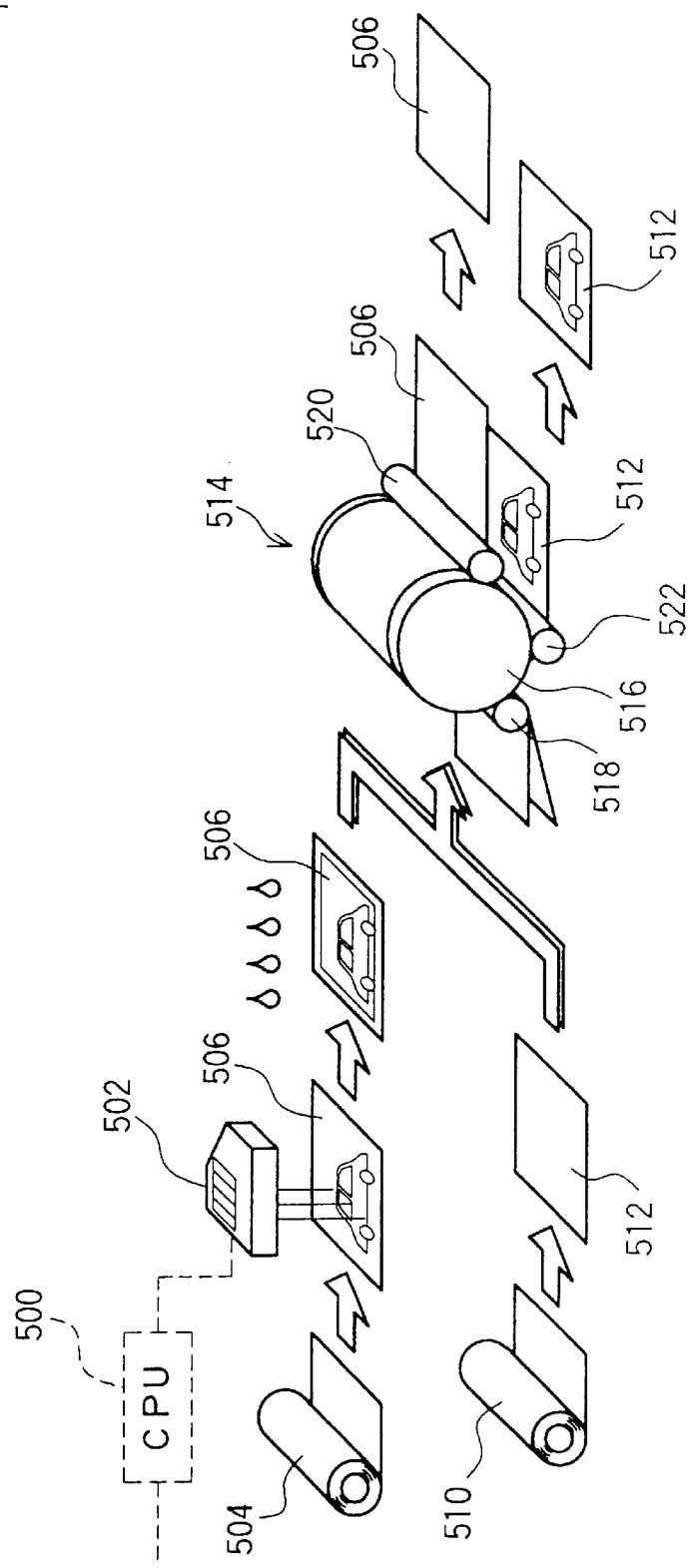
FIG. 6 is an explanatory view illustrating processing in a conventional image forming apparatus.

In a state illustrated in FIG. 5, the photosensitive material 16 comes up from off the image receiving material 108 as the front end portion of the photosensitive material 16 passes the laminating roller 204. The photosensitive material 16 which has come up from off the image receiving material 108 is scooped by the stripping finger 222 and guided to a paper discharging portion 226. Then, the photosensitive material 16 is forcedly discharged onto a discharge tray 224 by the paper discharging roller portion 226.

The image receiving material 108, from which the photosensitive material 16 has been stripped off, is conveyed further in the direction of arrow A from a position of the stripping finger 222 in a state in which it is wound around the drum 202. The conveyed image receiving material 108 is stripped off from the drum 202 by the stripping finger 232 and sent to a stocker 236 (shown in FIG. 1) by an unillustrated paper discharging means to be stocked in the stocker 236.

As the above described heat development and transfer process is thus completed, the stripping finger mechanism 228 is returned to a position shown in FIG. 2. That is, the stripping finger 232 and the paper discharging roller 234 are no longer in a state in which they contact the outer peripheral surface of the drum 202. Further, the stripping finger 222 is returned from the state shown in FIG. 5 to a state shown in FIG. 4 (i.e., a state in which the stripping finger 222 is away from the drum 202). Then, another heat development and transfer process begins as a new photosensitive material 16 is sent out from the squeezing roller 56 and a new image receiving material 18 is sent out from the guide member 114.

Structure, operation and effects of the present second embodiment other than those which have been explained so far are the same as in the first embodiment as described above, and therefore, explanation thereof is omitted.

What is claimed is:

1. An image forming method for performing a heat development and transfer process in a state in which a photosensitive material and an image receiving material are laminated and wound around an outer peripheral surface of a drum, comprising the steps of:

(a) placing said photosensitive material and said image receiving material together and pressing them to laminate at an entrance of a heating conveying path;

(b) introducing said photosensitive material and said image receiving material onto the outer peripheral surface of said drum through said entrance of said heating conveying path for carrying in said photosensitive material and said image receiving material which have been laminated;

(c) heating said photosensitive material and said image receiving material in a state in which they are laminated while being conveyed along the outer peripheral surface of said drum synchronously with a rotation of said drum; and (d) separating said photosensitive material and said image receiving material which have been subjected to a heat development and transfer process on said drum after passing them through said entrance of said heating conveying path a second time.

2. An image forming method according to claim 1, wherein the step (d) further includes the sub-steps of:

(i) separating said photosensitive material from said image receiving material; and (ii) separating said image receiving material from the outer peripheral surface of said drum.

* * * * *